UNITED STATES PATENT OFFICE.

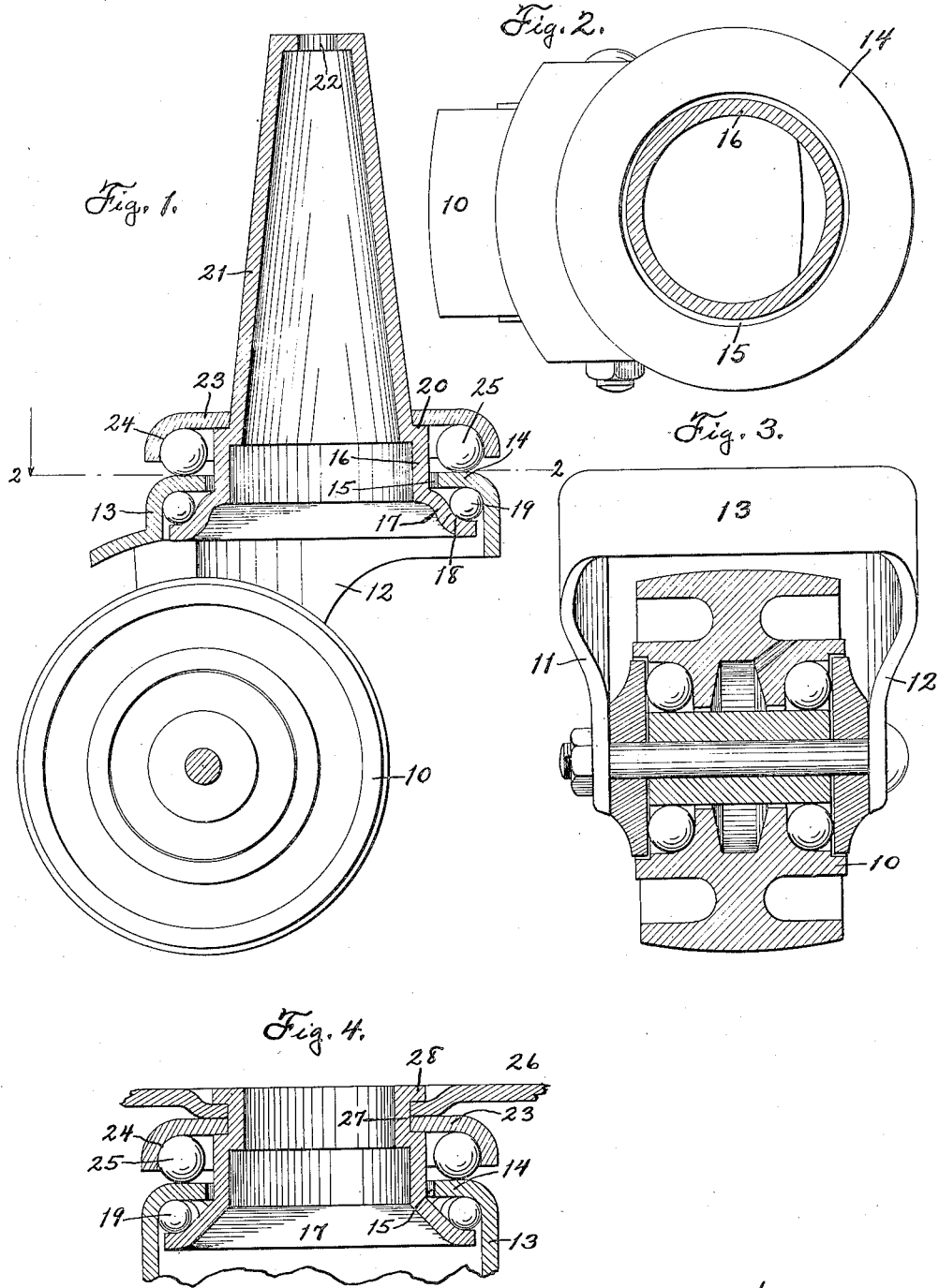

JOHN LOUCIEN CHESNUTT, OF LONG BEACH, CALIFORNIA.

SWIVEL-CASTER.

1,392,914.　　　　Specification of Letters Patent.　　Patented Oct. 11, 1921.

Application filed April 30, 1921. Serial No. 465,887.

*To all whom it may concern:*

Be it known that I, JOHN LOUCIEN CHESNUTT, a citizen of the United States of America, and resident of Long Beach, Los Angeles county, California, have invented a new and useful Swivel-Caster, of which the following is a specification.

The object of this invention is to provide an improved construction for a swivel caster especially adapted for use on household and office furniture.

A further object of this invention is to provide an improved swivel caster having anti-friction connections between the stationary and swiveling parts possessing the highest swiveling efficiency, thereby securing ease in operation, longer life of parts, less strain on the load object and less wear on the floors traversed.

A further object of this invention is to produce a swivel caster of exceedingly simple construction, which is economical to manufacture and not apt to get out of order.

A further object of this invention is to provide an improved swivel caster so arranged as to provide a large diameter for the race of balls taking lateral strain and to afford an anti-friction retaining means resulting in decreased leverage, less strain and friction and consequent wear and breakage, as well as increasing the swiveling efficiency.

A further object of this invention is to provide improved means for securing the caster to a load object.

With these and other objects in view, my invention consists in the construction, arrangement and combination of elements hereinafter set forth, pointed out in my claims and illustrated by the accompanying drawing, in which—

Figure 1 is a vertical section illustrating the swiveling features of my improved caster. Fig. 2 is a transverse section on the line 2—2 of Fig. 1. Fig. 3 is a front view of the lower portion of the device, the wheel being shown in section. Fig. 4 is a vertical section of the swiveling parts, showing a modified construction.

In the construction of the device as shown a wheel 10 of any suitable construction is journaled for rotation in a wheel yoke formed with spaced parallel wings 11, 12 formed on and extending downwardly from a cylindrical body portion 13. The wings 11, 12 taper toward their lower ends and project rearwardly of the vertical axis of the body 13, and the wheel's axis of rotation is set to the rear of the said vertical axis. The wheel 10 preferably is of suitable anti-friction construction, one form of which is shown in Fig. 3. The cylindrical body 13 of the yoke is formed at its top with an annular cover member 14 having a relatively large opening 15 of circular form concentric with the vertical axis of the device. A load bearing device is provided and extends within the body portion of the wheel yoke, on which load bearing device said wheel yoke is adapted to swivel or rotate. This load device comprises primarily a cylindrical shell 16 extending through the central aperture 15 of the top of wheel yoke and formed at its lower end with an outwardly and downwardly extending peripheral flange 17 projecting beneath the top of the wheel yoke and spaced from the top and body of said wheel yoke. The peripheral flange 17 is formed on its outer face and near its periphery with a concaved or grooved surface forming a ball race 18 within which is mounted an annular row 19 of bearing balls, which also contact the body and top of the wheel yoke. It is the function of the balls 19 to receive lateral pressure and strain only, which strain is exerted upon them on oblique or diagonal lines of approximately forty-five degrees to the perpendicular. The cylindrical shell 16 extends a short distance above the top 14 of the wheel yoke and is formed with an inwardly projecting flange or shoulder 20 of annular form. As shown in Fig. 1 the load bearing device extends upwardly a considerable distance above the shoulder or flange 20 and is tapered, forming a hollow stem 21, closed at its top except for a screw hole 22 formed centrally therein. The tapered stem 21 is adapted to be received within a socket or bore of an object to be supported, such as a leg or other portion of an article of furniture, and to be secured therein by any desired means, as for instance a screw extending upwardly through the hole 22 and seated in said object. It is to be understood, however, that the stem 21 may be formed solid and that the screw may be formed on and project upwardly from its upper end; or other suitable securing means may be employed for retaining the caster in a load object, one of which is hereinafter more particularly described.

A cupped washer 23 is mounted over the stem 21 and fits snugly the lower end thereof, resting rigidly on the flange or shoulder 20. The washer 23 is cupped, pressed or curved downwardly at its outer periphery to form a raceway 24 and retaining means for an annular row 25 of bearing balls resting on the annular plate or top 14 of the wheel yoke. The load object to be supported is adapted to rest on the washer 23, which would extend circumferentially of the hole or socket in said object when the connection above referred to is employed. The washer 23 in turn rests on the balls 25, which are designed to receive vertical pressure, or pressure of the load only, and no lateral strains, as there is a clearance between said balls and the adjacent sides of the shell 16, or in other words said balls have some lateral play or freedom of movement.

It will be noted that the manner of connecting the swiveling member to the stationary member, and of forming the ball races, provides raceways of relatively large diameter for both rows of bearing balls, which affords large anti-friction surfaces resulting in decreased leverage on the device under strain, lessens strain, friction, wear, and breakage and gives increased swiveling efficiency.

Also that the provision that each row of bearing balls receives pressure in one direction only, either lateral or vertical, adds largely to the efficiency and life of the device by decreasing wear on the balls and races, as the balls have no tendency to rotate on more than one axis simultaneously.

In Fig. 4 I have illustrated another form of load bearing device in which the stem 21 is omitted and substituted by a horizontal plate 26, of any desired form and shape, a portion only being shown. The plate 26 is formed with a central hole fitting the upper end of a neck 27 formed on the load bearing member above the flange or shoulder 20, said plate resting on the cupped washer 23 and being held in place by an outturned flange 28 on the upper end of said neck. The plate 26 is adapted to be attached to the flat under surface of a load object in any suitable manner.

The shoulder, flange or offset 20 spaces the disk or washer 23 correctly relative to the top of the wheel yoke, allowing space for proper swiveling and for both rows of balls.

The anti-friction connecting means between the stationary and swiveling parts provides a raceway in which the balls extend outside the vertical plane passing through the axis of the wheel 10, thus decreasing leverage, strain, friction, wear and breakage of the parts.

I claim as my invention—

1. A swivel caster, comprising a wheel yoke and wheel pivoted therein, said wheel yoke being formed with a cylindrical body and an annular plate thereon, a load bearing member having a cylindrical shell projecting through the annular plate of said yoke and terminating in an outwardly and downwardly extending flange, said flange being formed on its outer face with a concaved raceway, bearing balls mounted in said raceway and in contact with said wheel yoke and adapted to receive lateral pressure only, said shell being formed at its upper end with a flange or shoulder and also provided with means for attaching to a load object, a cupped disk or washer supported rigidly on the shoulder or flange and formed with an internal raceway, and bearing balls in said raceway and resting on the annular plate of the wheel yoke, the last-named balls being adapted to receive vertical pressure only.

2. A swivel caster, comprising a wheel yoke and wheel pivoted therein, said wheel yoke being formed with a cylindrical body and with an annular plate on the upper end thereof, a load bearing member including a cylindrical shell extending through the annular plate of the wheel yoke, said shell terminating in a downwardly and outwardly projecting flange extending beneath the plate of the wheel yoke, said flange being formed peripherally with an external raceway, an annular row of balls mounted in said raceway and contacting the walls of said shell and annular plate, said shell being formed at its upper end with a flange or shoulder, a hollow stem integrally formed with said shell and extending upwardly from said flange or shoulder, a cupped washer arranged concentrically of said stem and supported rigidly on said flange or shoulder, said stem and cupped washer adapted to support a load object, and an annular row of bearing balls mounted within said cupped washer and resting on the annular plate of the wheel yoke, said last-named balls having a freedom of movement laterally and receiving downward pressure only.

3. In a swivel caster, a wheel yoke and wheel pivoted therein, said yoke being formed with a flat annular top member, and a load bearing member extending within said yoke and formed with an external shoulder, a cupped disk mounted on said shoulder, and bearing balls within said cupped disk resting on said annular top member of the yoke.

Signed at Des Moines, in the county of Polk and State of Iowa, this 8" day of April, 1921.

JOHN LOUCIEN CHESNUTT.